(12) United States Patent
Farquhar et al.

(10) Patent No.: US 7,097,242 B2
(45) Date of Patent: Aug. 29, 2006

(54) ANTI-BACKDRIVING ACTIVE HEAD RESTRAINT

(75) Inventors: Mark A. Farquhar, Ortonville, MI (US); Kambiz H. Z. Eslam, Ingolstadt (DE); Oliver Klier, Rennertshofen (DE); Eric F. Kozlowski, Oakland, MI (US); Kar K. Low, Southfield, MI (US); Christoph Warnken, Ingolstadt (DE); Nagarjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/360,391

(22) Filed: Feb. 6, 2003

(65) Prior Publication Data

US 2004/0155496 A1 Aug. 12, 2004

(51) Int. Cl.
*B60N 2/42* (2006.01)

(52) U.S. Cl. .............................. 297/216.12; 297/216.14
(58) Field of Classification Search ............ 297/216.12, 297/216.13, 216.14, 408, 216.4
See application file for complete search history.

(56) References Cited

U.S. PATENT DOCUMENTS

| 2,869,622 A | 1/1959 | Peterson et al. |
| 3,008,767 A | 11/1961 | Fox |
| 3,397,911 A | 8/1968 | Brosius, Sr. |
| 3,498,670 A | 3/1970 | Finch et al. |
| 3,680,912 A | 8/1972 | Matsuura |
| 4,082,354 A | 4/1978 | Renner et al. |
| 4,190,291 A | 2/1980 | Korger |
| 4,511,180 A | 4/1985 | Klaus |
| 4,626,028 A | 12/1986 | Hatsutta et al. |

(Continued)

FOREIGN PATENT DOCUMENTS

| DE | 2 152 202 | 10/1971 |
| DE | 2 152 437 | 10/1971 |
| DE | 199 24 236 C1 | 10/2000 |
| DE | 100 49 180 A1 | 4/2002 |
| GB | 2 371 223 A | 7/2002 |
| WO | WO 98/09838 | 3/1998 |
| WO | WO 98/16406 | 4/1998 |

OTHER PUBLICATIONS

J. Latchford and E.C. Chirwa, "Airbag Head Restraint System", Automotive Engrng., Faculty of Technology, Bolton Institute, UK.

*Primary Examiner*—Peter R. Brown
(74) *Attorney, Agent, or Firm*—Brooks Kushman P.C.

(57) ABSTRACT

A vehicle seat for use with a vehicle includes a seatback frame having a first locking element, and a head restraint arrangement movably associated with the seatback frame. The head restraint arrangement includes a second locking element that is engageable with the first locking element. Upon a sufficient impact to the vehicle, the head restraint arrangement is configured to move with respect to the seatback frame from an initial position toward a support position. Furthermore, the locking elements are configured to allow movement of the head restraint arrangement toward the support position, while inhibiting movement toward the initial position.

10 Claims, 5 Drawing Sheets

U.S. PATENT DOCUMENTS

| | | |
|---|---|---|
| 4,762,367 A | 8/1988 | Denton |
| 4,822,102 A | 4/1989 | Duvenkamp |
| 5,011,225 A | 4/1991 | Nemoto |
| 5,205,585 A | 4/1993 | Reuber et al. |
| 5,378,043 A | 1/1995 | Viano et al. |
| 5,484,189 A | 1/1996 | Patterson |
| 5,664,841 A | 9/1997 | Dal Monte |
| 5,738,412 A * | 4/1998 | Aufrere et al. ............. 297/408 |
| 5,772,280 A | 6/1998 | Massara |
| 5,795,019 A | 8/1998 | Wieclawski |
| 5,823,619 A | 10/1998 | Heilig et al. |
| 5,882,071 A | 3/1999 | Fohl |
| 5,884,968 A | 3/1999 | Massara |
| 5,927,804 A | 7/1999 | Cuevas |
| 5,934,750 A | 8/1999 | Fohl |
| 5,938,279 A | 8/1999 | Schubring et al. |
| 5,961,182 A | 10/1999 | Dellanno |
| 6,017,086 A | 1/2000 | Meyer et al. |
| 6,019,424 A | 2/2000 | Ruckert et al. |
| 6,022,074 A | 2/2000 | Swedenklef |
| 6,024,406 A | 2/2000 | Charras et al. |
| 6,033,018 A | 3/2000 | Fohl |
| 6,082,817 A | 7/2000 | Muller |
| 6,088,640 A | 7/2000 | Breed |
| 6,213,548 B1 | 4/2001 | Van Wynsberghe et al. |
| 6,250,714 B1 | 6/2001 | Nakano et al. |
| 6,273,511 B1 | 8/2001 | Wieclawski |
| 6,352,285 B1 * | 3/2002 | Schulte et al. ........... 297/216.2 |
| 6,416,125 B1 | 7/2002 | Shah et al. |
| 6,607,242 B1 * | 8/2003 | Estrada et al. ........... 297/216.2 |
| 6,688,697 B1 * | 2/2004 | Baumann et al. ........... 297/391 |
| 2002/0113483 A1 | 8/2002 | Fischer et al. |

* cited by examiner

ANTI-BACKDRIVING ACTIVE HEAD RESTRAINT

BACKGROUND OF THE INVENTION

1. Field of the Invention

The invention is directed to a vehicle seat having a movable head restraint.

2. Background Art

Vehicle seats having movable headrests or head restraints are known in the vehicle seating art. Examples of such vehicle seats are disclosed in U.S. Pat. No. 4,822,102 and U.S. Pat. No. 4,762,367.

SUMMARY OF THE INVENTION

Under the invention, a vehicle seat for use with a vehicle is provided. The vehicle seat includes a seatback frame having a first locking element, and a head restraint arrangement movably associated with the seatback frame. The head restraint arrangement includes a second locking element that is engageable with the first locking element. Upon a sufficient impact to the vehicle, the head restraint arrangement is configured to move with respect to the seatback frame from an initial position toward a support position. Furthermore, the locking elements are configured to allow movement of the head restraint arrangement toward the support position, while inhibiting movement toward the initial position.

DETAILED DESCRIPTION OF THE PREFERRED EMBODIMENT(S)

Figure 1:
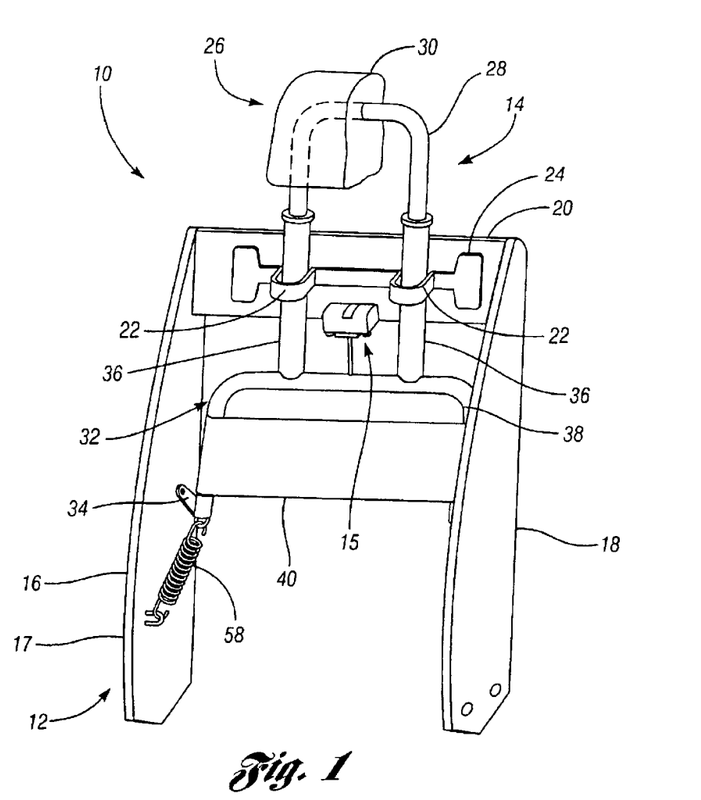
FIG. 1 is a perspective view of a vehicle seat according to the invention, including a seatback frame and a head restraint arrangement moveably associated with the seatback frame.

FIG. 1 shows a vehicle seat 10, according to the invention, for use with a vehicle (not shown). The vehicle seat 10 includes a seatback frame 12, which may be attached directly to a vehicle floor (not shown), or otherwise supported by the vehicle floor. For example, the seatback frame 12 may be attached to a seat adjuster (not shown) that is attached to the vehicle floor. As another example, the seatback frame 12 may be connected to a lower seat cushion frame (not shown) in any suitable manner, such as with a recliner mechanism (not shown) that allows the seatback frame 12 to pivot between a full upright position (shown in FIG. 1) and a reclined position (not shown). The vehicle seat 10 further includes a movable head restraint arrangement 14 supported by and movably associated with the seatback frame 12, and a lock arrangement or mechanism 15 associated with the head restraint arrangement 14 for inhibiting movement of the head restraint arrangement 14, as described below in detail.

While the seatback frame 12 may have any suitable configuration, in the embodiment shown in FIG. 1, the seatback frame 12 includes a seatback frame body 16 having first and second side portions, such as first and second side supports 17 and 18, respectively, and an upper laterally extending portion or cross member 20. The side supports 17, 18 and cross member 20 may be formed as separate components that are joined together in any suitable manner, such as by welding. Alternatively, two or more of these components 17, 18 and 20 may be integrally formed.

In the embodiment shown in FIG. 1, the seatback frame 12 also includes one or more guide members, such as guide channels 22, for guiding movement of the head restraint arrangement 14, as explained below in greater detail. The guide channels 22 may be integrally formed with the seatback frame body 16, or attached to a portion of the seatback frame body 16 in any suitable manner. In the embodiment shown in FIG. 1, for example, the guide channels 22 are formed as part of a guide bracket 24, which is welded to the cross member 20. The guide channels 22 may also include guide bushings to facilitate movement of the head restraint arrangement 14.

The head restraint arrangement 14 includes a head restraint 26 having a head restraint frame or cushion frame 28 and a head restraint pad or cushion 30 attached to the cushion frame 28. The head restraint arrangement 14 further includes a support structure 32 connected to the cushion frame 28. In the embodiment shown in FIG. 1, the cushion frame 28 is slidably connected to the support structure 32 such that the head restraint 26 may be adjusted vertically with respect to the support structure 32.

The support structure 32 may be moveably attached to the seatback frame 12 in any suitable manner for allowing movement of the head restraint arrangement 14 with respect to the seatback frame 12. For example, in the embodiment shown in FIG. 1, the support structure 32 is attached to the seatback frame 12 with moveable links 34. As another example, the support structure 32 may be attached to the seatback frame 12 with slide brackets.

While the support structure 32 may have any suitable configuration, in the embodiment shown in FIG. 1, the support structure 32 includes an upper portion, such as two generally vertical risers 36, attached to a generally U-shaped main body or support frame 38. The risers 36 extend into the guide channels 22, which guide movement of the support structure 32. Furthermore, the guide channels 22 and/or risers 36 may each have one or more cam and/or follower surfaces for guiding movement of the support structure 32. Alternatively, if the seatback frame 12 includes only one guide channel 22, the support structure 32 may be provided with only one riser 36.

The support structure 32 further includes an impact target 40 attached to the support frame 38. As explained below in detail, a sufficient rearward force acting upon the impact target 40 causes movement of the head restraint arrangement 14 from a normal use position or initial position (shown in FIG. 1 and in solid lines in FIG. 2), toward a fully actuated position or support position (shown in phantom lines in FIG. 2).

Figure 2:
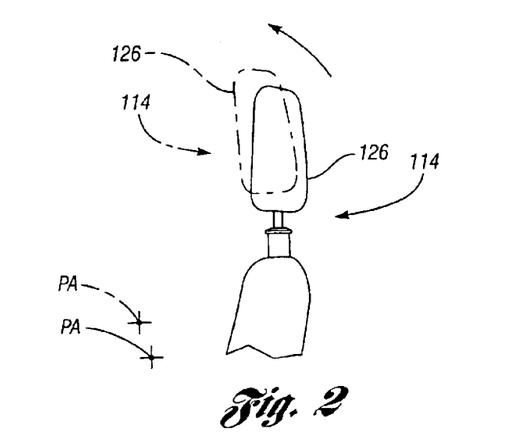
FIG. 2 is a fragmentary, schematic side view of the vehicle seat with the head restraint arrangement in an initial position, shown in solid lines, and a fully actuated position, shown in phantom lines.
Figure 3A:
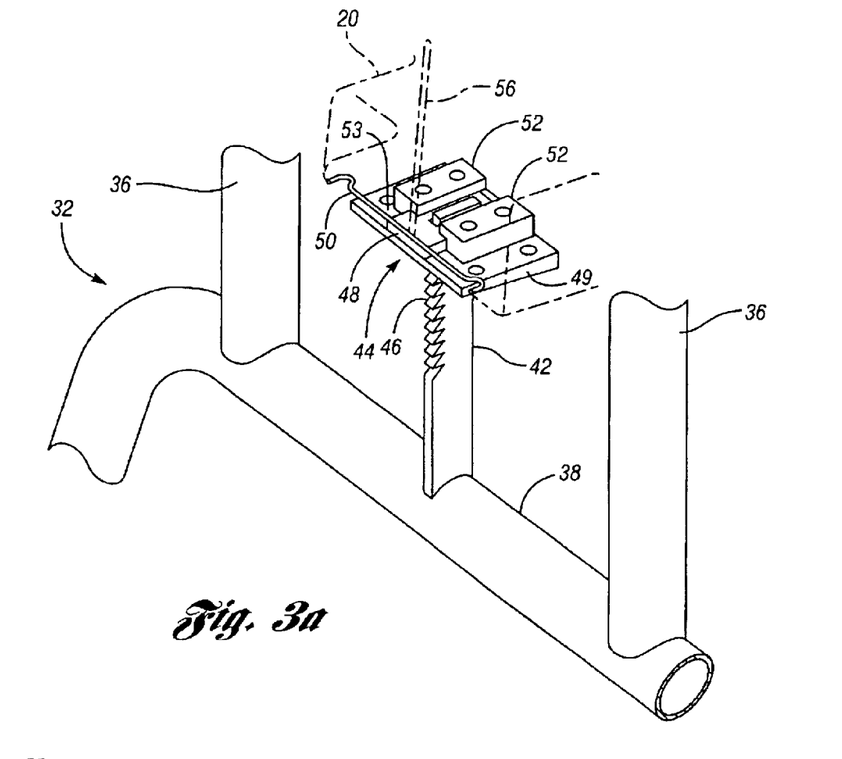
FIG. 3a is an enlarged perspective view of a lock mechanism of the vehicle seat, wherein the lock mechanism includes first and second locking elements.
Figure 3B:
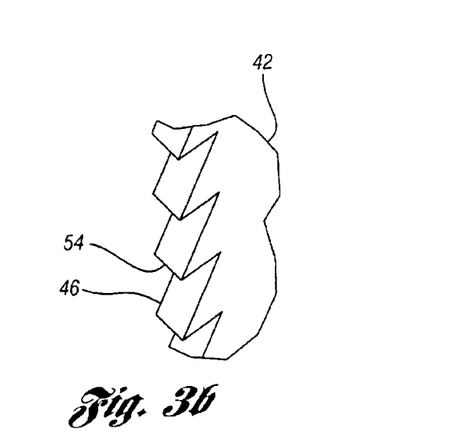
FIG. 3b is a fragmentary perspective view of a portion of the first locking element.
Figures 3C, 5B:
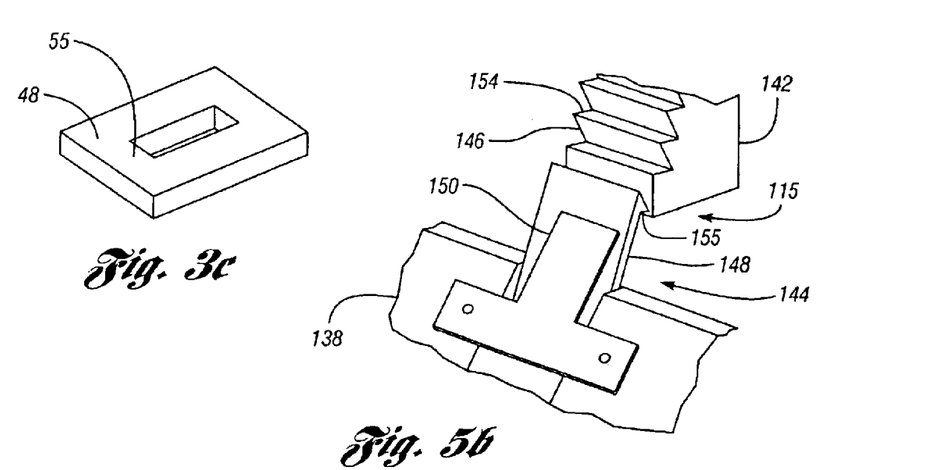
FIG. 3c is a perspective view of the second locking element.
FIG. 5b is an enlarged portion of FIG. 5a showing a lock mechanism of the vehicle seat of FIG. 4.

Referring to FIGS. 1–3, the lock mechanism 15 is configured to allow movement of the head restraint arrangement 14 toward the support position, while inhibiting movement of the head restraint arrangement 14 toward the initial position. In the embodiment shown in FIG. 3 (FIGS. 3a–3c), for example, the lock mechanism 15 includes a first locking element 42, such as a ratchet member, attached to the support frame 38, and a lock assembly 44 attached to the cross member 20 and configured to cooperate with the first locking element 42. With such a configuration, the first locking element 42 may be considered part of the head restraint arrangement 14, and the lock assembly 44 may be considered part of the seatback frame 12.

In the embodiment shown in FIG. 3, the first locking element 42 includes multiple projections, such as teeth 46, and the lock assembly 44 includes a moveable second locking element 48, such as a pawl, that is selectively engageable with the teeth 46 of the first locking element 42. The lock assembly 44 also includes a mounting member, such as support plate 49, attached to the cross member 20 for supporting the second locking element 48, a spring 50 engaged with the second locking element 48 for urging the second locking element 48 into engagement with the first locking element 42, and one or more guides 52 that receive the second locking element 48 for guiding movement of the second locking element 48 as the second locking element 48 slides on surface 53 of support plate 49. In the embodiment shown in FIG. 3, the spring 50 and the guides 52 may be attached to the cross member 20, such as with screws or other fastening elements. Furthermore, the guides 52 may comprise any suitable material or materials, such as TEFLON™ coated plastic, or other non-stick or pre-lubricated materials.

Alternatively, the lock mechanism 15 may have any suitable configuration to allow movement of the head restraint arrangement 14 toward the support position, while inhibiting movement of the head restraint arrangement 14 toward the initial position. Furthermore, the lock mechanism 15 may be configured to lock the head restraint arrangement 14 in one or more positions disposed away from the initial position. For example, the lock mechanism 15 may be configured as a friction-type lock mechanism.

As another example, the lock mechanism 15 may comprise one or more zip ties, such as used to bundle multiple wires together. Each zip tie includes a first locking element, such as a longitudinal member having a plurality of projections, including bumps, ridges, or teeth. Each zip tie further includes a second locking element, such as a collar, that receives the first locking element and is engageable with the projections to inhibit movement of the locking elements with respect to each other. Typically, each zip tie is provided with the locking elements fixed together such that the first locking element may be inserted into the second locking element. If used in the lock mechanism 15, the locking elements may be separated from each other so that one locking element may be attached to the seatback frame body 16, and the other locking element may be attached to the support structure 32.

Referring to FIGS. 1–3, operation of the vehicle seat 10 will now be described in more detail. Generally, sufficient rearward loading on the impact target 40 by a seat occupant, such as during a rear crash event, causes the head restraint arrangement 14 to pivot with respect to the seatback frame 12 about a pivot axis PA, which may be a fixed or variable (instantaneous) pivot axis (in the embodiment shown in FIG. 2, the pivot axis is a variable pivot axis that moves from an initial position to a final position above the initial position). More specifically, sufficient rearward loading on the impact target 40 causes the impact target 40 to move rearwardly and upwardly with respect to the seatback frame 12. This movement of the impact target 40 causes the risers 36 to move upwardly through the guide channels 22. As the risers 36 move upwardly, interaction between the risers 36 and the guide channels 22 causes the risers 36 to rotate forwardly, thereby causing the head restraint 26 to move forwardly, in addition to moving upwardly. As a result, the head restraint 26 moves from an initial position (shown in FIG. 1 and in solid lines in FIG. 2) to a fully actuated position or support position (shown in phantom lines in FIG. 2) for providing support to the head of the occupant.

Referring to FIG. 3, as the risers 36 and the rest of the support structure 32 move upwardly, the first locking element 42 moves upwardly through an aperture in the support plate 49 and an aperture in the second locking element 48, such that the teeth 46 of the first locking element 42 engage the second locking element 48. The locking elements 42 and 48 are configured to allow upward movement of the head restraint arrangement 14, while inhibiting downward movement of the head restraint arrangement 14. In the embodiment shown in FIG. 3, for example, the teeth 46 of the first locking element 42 are sloped to allow upward travel of the head restraint arrangement 14. Furthermore, each tooth 46 includes a flat edge 54 that is engageable with a flat edge 55 of the second locking element 48 to inhibit downward travel of the head restraint arrangement 14. In the embodiment shown in FIG. 3, the spring 50 urges the second locking element 48 into engagement with the first locking element 42, while also allowing lateral movement of the second locking element 50 to permit upward movement of the first locking element 42.

Because the locking elements 42 and 48 allow movement of the head restraint 26 toward the support position, while inhibiting movement of the head restraint 26 toward the initial position, backdriving of the head restraint 26 due to rearward loading from the seat occupant's head is inhibited or eliminated. Furthermore, rearward rotation of the seat occupant's head is reduced.

In addition, with the above described configuration, the locking elements 42 and 48 may cooperate to lock the head restraint arrangement 14 in any one of multiple intermediate support positions between the initial position (shown in solid lines in FIG. 2) and the support position (shown in phantom lines in FIG. 2), depending on the degree of rearward loading on the impact target 40. As a result, backdriving of the head restraint 26 may be inhibited or eliminated at any one of the intermediate support positions.

The vehicle seat 10 may also include a release device for disengaging the locking elements 42 and 48 to allow movement of the head restraint arrangement 14 toward the initial position. In the embodiment shown in FIG. 3, for example, the lock assembly 44 includes a release lever 56 (shown in phantom lines) attached to the second locking element 48 and/or spring 50. The release lever 56 is also pivotally connected to the cross member 20, and extends to a position proximate the top of seatback frame 12, such that the release lever 56 is accessible for manual actuation. When the release lever 56 is pivoted with respect to the cross member 20, the second locking element 48 is disengaged from the first locking element 42 to allow downward movement of the head restraint arrangement 14.

Alternatively, vehicle seat 10 may be provided with any suitable release device for disengaging the first and second locking elements 42 and 48. For example, the vehicle seat 10 may include a cable connected to the second locking element 48 and/or spring 50, and a release lever connected to the cable for moving the cable in order to move the second locking element 48 away from the first locking element.

In addition, the vehicle seat 10 may include one or more biasing members operatively associated with the seatback frame 12 and the support structure 32 for urging the head restraint arrangement 14 toward the initial position. In the embodiment shown in FIG. 1, for example, the vehicle seat 10 includes two return springs 58 connected between the side supports 17, 18 and the support frame 38.

Furthermore, the vehicle seat 10 may be configured such that the head restraint arrangement 14 is moveable in the above described manner without requiring loading on the impact target 40. For example, the head restraint 26 may be provided with sufficient mass such that, as a result of a sufficient impact to the vehicle (e.g., a front crash event), forward inertia of the head restraint 26 causes the head restraint arrangement 14 to pivot or otherwise move with respect to the seatback frame 12.

Figure 4:
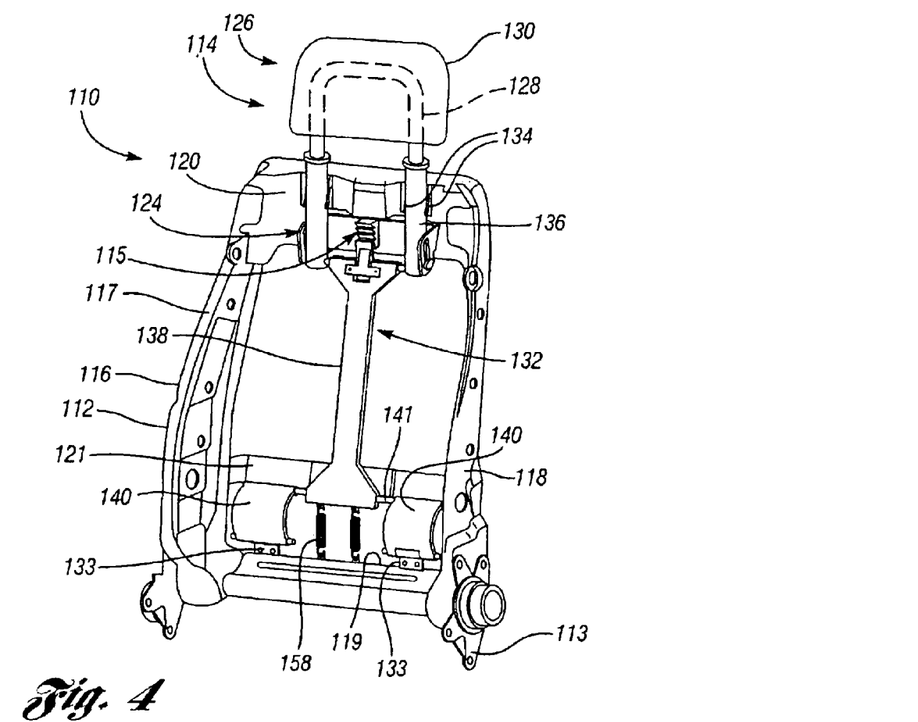
FIG. 4 is a perspective view of a second embodiment of a vehicle seat according to the invention, including a seatback frame and a head restraint arrangement moveably associated with the seatback frame.

FIG. 4 shows a second embodiment 110 of a vehicle seat according to the invention. The vehicle seat 110 includes a seatback frame 112 that may be connected to a lower seat cushion frame (not shown) in any suitable manner, such as with one or more recliner mechanisms 113 that allow the seatback frame 112 to pivot between a full upright position (shown in FIG. 4) and a reclined position (not shown). Alternatively, the seatback frame 112 may be attached directly to a vehicle floor (not shown), or otherwise supported by the vehicle floor, such as described above with respect to the vehicle seat 10. The vehicle seat 110 further includes a movable head restraint arrangement 114 supported by and movably associated with the seatback frame 112, and a lock arrangement or mechanism 115 associated with the head restraint arrangement 114 for inhibiting movement of the head restraint arrangement 114, as described below in detail.

While the seatback frame 112 may have any suitable configuration, in the embodiment shown in FIG. 4, the seatback frame 112 includes a seatback frame body 116 having first and second side portions, such as first and second side supports 117 and 118, respectively, and first and second laterally extending portions, such as cross members 119 and 120. The seeatback frame body 116 further includes an additional cross member or bearing member 121 that extends between the side supports 117 and 118. The components 117–121 may be formed as separate components that are joined together in any suitable manner, such as by welding. Alternatively, two or more of these components 117–121 may be integrally formed.

Figure 5A:
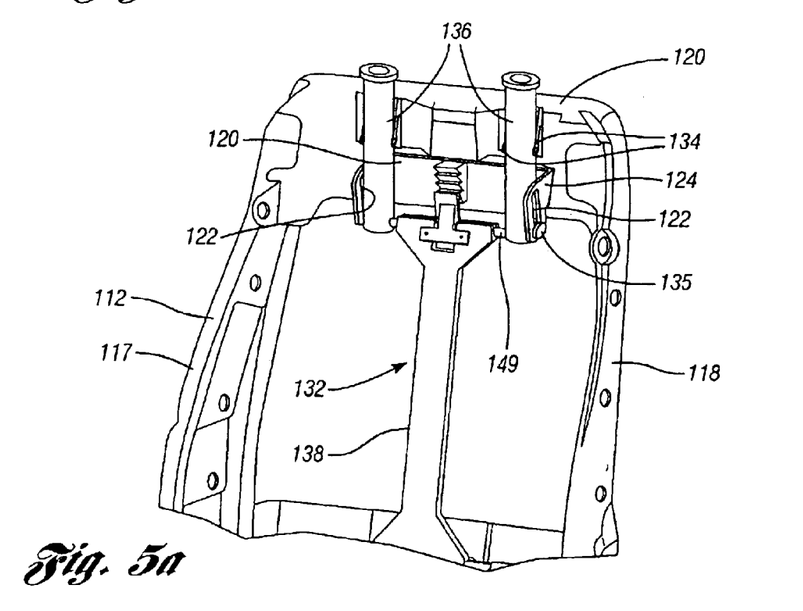
FIG. 5a is an enlarged perspective view of a portion of the vehicle seat of FIG. 4.

Referring to FIG. 5 (FIGS. 5a and 5b), the seatback frame 112 also includes one or more guide members, such as guide slots 122, for guiding movement of the head restraint arrangement 114, as explained below in greater detail. Although the guide slots 122 are shown as straight slots, each guide slot 122 may have any suitable configuration, such as a slot having a curved portion and a straight portion. The guide slots 122 may be formed in the seatback frame body 116, or attached to a portion of the seatback frame body 116 in any suitable manner. In the embodiment shown in FIG. 5, for example, the guide slots 122 are formed in a guide bracket 124, which is fixed to the cross member 120.

Referring to FIG. 4, the head restraint arrangement 114 includes a head restraint 126 having a head restraint frame or cushion frame 128 and a head restraint pad or cushion 130 attached to the cushion frame 128. The head restraint arrangement 114 further includes a support structure 132 connected to the cushion frame 128. In the embodiment shown in FIG. 4, the cushion frame 128 is slidably connected to the support structure 132 such that the head restraint 126 may be adjusted vertically with respect to the support structure 132.

Referring to FIGS. 4 and 5, the support structure 132 may be moveably attached to the seatback frame 112 in any suitable manner for allowing movement of the head restraint arrangement 114 with respect to the seatback frame 112. For example, in the embodiment shown in FIGS. 4 and 5, the support structure 132 is attached to the seatback frame 112 with connecting members, such as brackets 133, moveable links 134 and projections, such as pins 135. The links 134 and pins 135 also function as guide members for guiding movement of the head restraint arrangement 114, as explained below in detail.

Figures 6, 7:
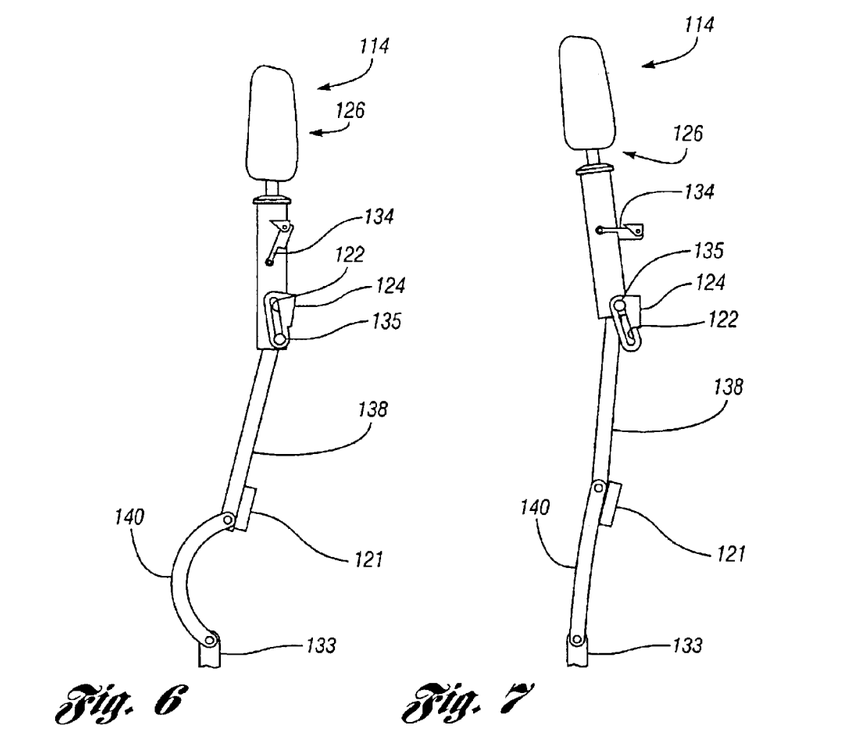
FIG. 6 is a schematic side view of the vehicle seat of FIG. 4, showing the head restraint arrangement in an initial position.
FIG. 7 is a schematic side view of the vehicle seat of FIG. 4, showing the head restraint arrangement in a fully actuated position.
Figure 8:
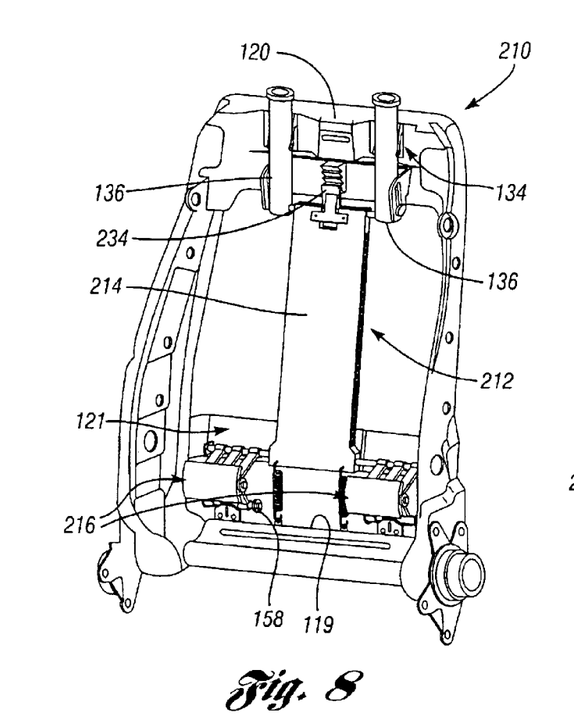
FIG. 8 is a perspective view of a third embodiment of a vehicle seat according to the invention, including a seatback frame and a head restraint arrangement moveably associated with the seatback frame.

While the support structure 132 may have any suitable configuration, in the embodiment shown in FIGS. 4 and 5, the support structure 132 includes an upper portion, such as two generally vertical risers 136, attached to a link member or bracket 138. The support structure 132 further includes one or more impact members or targets 140 attached to the link bracket 138 and the cross member 119. Each impact target 140 may be attached to the link bracket 138 and cross member 119 in any suitable manner, such as with a rod 141 and bracket 133, respectively. As explained below in detail, a sufficient rearward force acting upon the impact targets 140 causes movement of the head restraint arrangement 114 from a normal use position or initial position (shown in FIG. 6) toward a fully actuated position or support position (shown in FIG. 7). As shown in FIG. 6, the impact targets 140 are curved or bowed when the head restraint arrangement 114 is in the initial position.

Referring to FIGS. 4 and 5, the lock mechanism 115 is configured to allow movement of the head restraint arrangement 114 toward the support position, while inhibiting movement of the head restraint arrangement 114 toward the initial position. In the embodiment shown FIG. 5, for example, the lock mechanism 115 includes a first locking element 142, such as a ratchet member, attached to the guide bracket 124, and a lock assembly 144 attached to the support structure 132 and configured to cooperate with the first locking element 142. With such a configuration, the first locking element 142 may be considered part of the seatback frame 112, and the lock assembly 144 may be considered part of the head restraint arrangement 114.

In the embodiment shown FIG. 5, the first locking element 142 includes multiple projections, such as teeth 146, and the lock assembly 144 includes a second locking element 148, such as a pawl, that is selectively engageable with the teeth 146 of the first locking element 142. In this embodiment, the second locking element 148 is rotatably attached to a rod 149 that extends between the risers 136. The lock assembly 144 further includes a spring 150 engaged with the second locking element 148 for urging the second locking element 148 into engagement with the first locking element 142. The spring 150 is also attached to the link bracket 138.

Alternatively, the lock mechanism 115 may have any suitable configuration to allow movement of the head restraint arrangement 114 toward the support position, while inhibiting movement of the head restraint arrangement 114 toward the initial position. Furthermore, the lock mechanism 115 may be configured to lock the head restraint arrangement 114 in one or more positions disposed away from the initial position.

Referring to FIGS. 4–7, operation of the vehicle seat 110 will now be described in more detail. Generally, sufficient rearward loading on the impact targets 140 by a seat occupant, such as during a rear crash event, causes the head restraint arrangement 114 to move with respect to the seatback frame 112 from the initial position, shown in FIG. 6, toward the support position, shown in FIG. 7. More specifically, sufficient rearward loading on the impact targets 140 causes the impact target 140 to flatten toward the bearing member 121, which causes the impact targets 140 to lengthen vertically. This movement of the impact targets 140 causes the link bracket 138 to move upwardly, which causes the risers 136 to move upwardly through openings in the cross member 120. As the risers 136 move upwardly, interaction between the pins 135 and the guide slots 122 causes the risers 136 to rotate forwardly. The links 134 also guide forward movement of the risers 136. As a result, the head restraint 126 moves forwardly and upwardly from an initial position (shown in FIG. 6) to a fully actuated position or support position (shown in FIG. 7) for providing support to the head of the occupant.

Referring to FIG. 5, as the risers 136 and the rest of the support structure 132 move upwardly, the second locking element 148 moves upwardly with respect to the first locking element 142, such that the second locking element 148 engages the teeth 146 of the first locking element 142. The locking elements 142 and 148 are configured to allow upward movement of the head restraint arrangement 114, while inhibiting downward movement of the head restraint arrangement 114. In the embodiment shown in FIG. 5, for example, the teeth 146 of the first locking element 142 are sloped to allow upward travel of the second locking element 148. Furthermore, each tooth 146 includes a flat edge 154 that is engageable with a flat edge 155 of the second locking element 148 to inhibit downward travel of the second locking element 148 and head restraint arrangement 114. In the embodiment shown in FIG. 5, the spring 150 urges the second locking element 148 into engagement with the first locking element 142, while also allowing rotational movement of the second locking element 148 about the rod 149 to permit upward movement of the head restraint arrangement 114.

Because the locking elements 142 and 148 are configured to allow movement of the head restraint 126 toward the support position, shown in 7, while inhibiting movement of the head restraint 126 toward the initial position, shown in FIG. 6, backdriving of the head restraint 126 due to rearward loading from the seat occupant's head is inhibited or eliminated. Furthermore, rearward rotation of the seat occupant's head is reduced.

In addition, because the first locking element 142 has multiple teeth 146, the locking elements 142 and 148 may cooperate to lock the head restraint arrangement 114 in any one of multiple intermediate support positions between the initial position and the support position, depending on the degree of rearward loading on the impact targets 140. As a result, backdriving of the head restraint 126 may be inhibited or eliminated at any one of the intermediate support positions.

The vehicle seat 110 may also include a release device for disengaging the locking elements 142 and 148 to allow movement of the head restraint arrangement 114 toward the initial position. For example, the lock assembly 144 may include a release lever attached to or engageable with the second locking element 148 and/or spring 150. When the head restraint arrangement 114 is in any one of the support positions, the release lever may be configured to extend to a position proximate the top of seatback frame 112, such that the release lever is accessible for manual actuation. Upon actuation, the release lever may be configured to disengage the second locking element 148 from the first locking element 142 to allow downward movement of the head restraint arrangement 114. Alternatively, vehicle seat 110 may be provided with any suitable release device for disengaging the first and second locking elements 142 and 148, such as cable and lever assembly.

In addition, the vehicle seat 110 may include one or more biasing members operatively associated with the seatback frame 112 and the support structure 132 for urging the head restraint arrangement 114 toward the initial position. In the embodiment shown in FIG. 4, for example, the vehicle seat 10 includes two return springs 158 connected between the side supports 117, 118 and the support frame 138.

Alternatively or supplementally, the impact targets 140 may be configured to bias the head restraint arrangement 114 toward the initial position. For example, each impact target 140 may be formed from memory retention material, such as flexible plastic, so that each impact target 140 moves toward, or returns to, the configuration shown in FIG. 6 when the lock mechanism 115 is released and the rearward loading on the impact targets 140 is removed.

Furthermore, the vehicle seat 110 may be configured such that the head restraint arrangement 114 is moveable in the above described manner without requiring loading on the impact target 140. For example, the head restraint 126 may be provided with sufficient mass such that, as a result of a sufficient impact to the vehicle (e.g., a front crash event), forward inertia of the head restraint 126 causes the head restraint arrangement 114 to pivot or otherwise move with respect to the seatback frame 112.

FIGS. 8–11 show a third embodiment 210 of a vehicle seat according to the invention. The vehicle seat 210 is similar in construction and function to the vehicle seat 110, and similar features of the vehicle seat 210 and the vehicle seat 110 are identified with the same reference numbers. The following description will focus on some of the differences between the vehicle seat 210 and the vehicle seat 110.

First, support structure 212 includes a link member or bracket 214 having an alternate configuration, and one or more impact members or targets 216 connected to the link bracket 214. More specifically, referring to FIG. 9, the link bracket 214 has parallel support walls 218 separated by a support framework 220. This configuration provides high strength with reduced weight.

Figure 10:
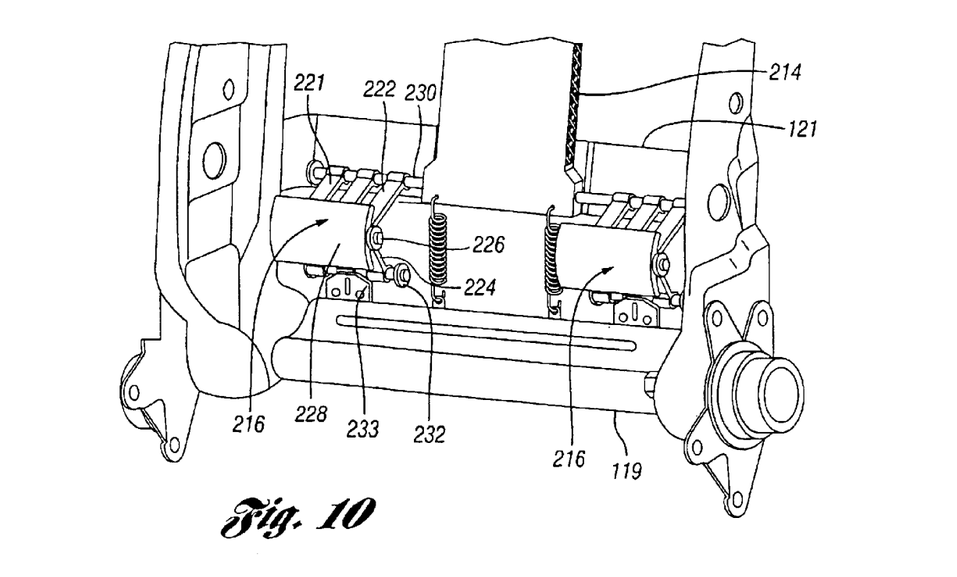
FIG. 10 is an enlarged view of a portion of the vehicle seat of FIG. 8, showing two impact members of the vehicle seat.

Referring to FIG. 10, each impact target 216 includes a hinge device 221 having first and second hinge portions 222 and 224, respectively, connected together by a connecting member, such as a pin 226, which defines a pivot axis. Each first hinge portion 222 is also connected to the link bracket 214, such as by a rod 230, and each second hinge portion 224 is connected to cross member 119, such as by a pin 232 and bracket 233. Each impact target 216 further includes an impact body 228 attached to the hinge device 221, such as by pin 226. With such a configuration, the hinge portions 222 and 224 and the impact body 228 of each impact target 216 may all pivot about a respective pin 226.

Figure 11:
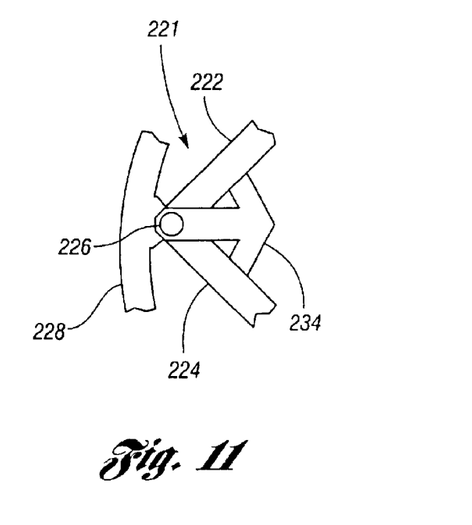
FIG. 11 is a fragmentary side view of one of the impact members of FIG. 10.

When the support structure 212 and corresponding head restraint (not shown) are in a normal use position or initial position, the hinge portions 222 and 224 of each hinge device 221 define an angle of less than 180 degrees. In the embodiment shown in FIGS. 10 and 11, for example, the hinge portions 222 and 224 of each hinge device may define an angle in the range of 90 to 110 degrees when the support structure 212 is in the initial position. Referring to FIG. 11, each hinge device 221 may also include one or more movement inhibiting members, such as stops 234, for limiting downward movement of the hinge device 221. The stops 234 may be connected, for example, to the pin 226 and/or one of the hinge portions 222 and 224.

Sufficient rearward loading on the impact bodies 228 by a seat occupant, such as during a rear crash event, causes each hinge device 221 to bear against the bearing member 121 and to flatten toward the bearing member 121, which causes each hinge device 221 to lengthen vertically. In other words, the angle between the hinge portions 222 and 224 of each hinge device 221 increases due to sufficient rearward loading on the impact bodies 228. This movement of the hinge devices 221 causes the link bracket 214 to move upwardly, which causes the risers 136 to move as described above with respect to the vehicle seat 110.

Figure 9:
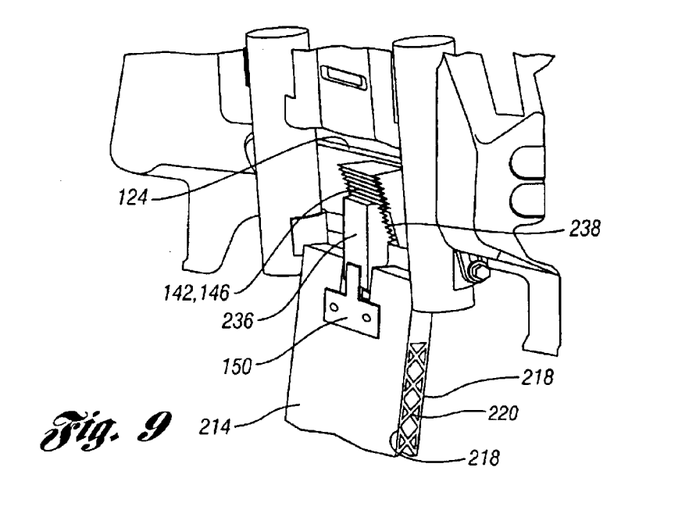
FIG. 9 is an enlarged view of a locking mechanism of the vehicle seat of FIG. 8.

Referring to FIG. 9, vehicle seat 210 also includes a second locking element 236 having an alternate configuration. More specifically, the second locking element 236 includes multiple projections, such as teeth 238, that are engageable with the teeth 146 of first locking element 142. With such a configuration, the locking elements 142 and 236 may provide greater resistance to downward movement of the support structure 212.

The components of the vehicle seats 10, 110 and 210 may be made in any suitable manner and from any suitable materials. Suitable manufacturing methods include stamping and injection or compression molding. Suitable materials include plastic and metal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use with a vehicle, the vehicle seat comprising:
   a seatback frame including a first locking element; and
   a head restraint arrangement movably associated with the seatback frame, the head restraint arrangement including a head restraint and a support structure connected to the head restraint, the support structure including an impact target and a second locking element that is engageable with the first locking element, wherein upon application of a sufficient rearward force on the impact target in response to a sufficient impact to the vehicle, the head restraint arrangement is configured to move with respect to the seatback frame from an initial position toward a support position, and wherein the locking elements are configured to allow movement of the head restraint arrangement toward the support position, while inhibiting movement toward the initial position.

2. The vehicle seat of claim 1 wherein the locking elements are configured to lock the head restraint arrangement, with respect to the seatback frame, in one of multiple positions disposed away from the initial position.

3. The vehicle seat of claim 4 wherein the seatback frame further includes first and second side portions, a cross member extending between the side portions, and a support plate attached to the cross member for supporting the first locking element, and wherein the first locking element is laterally slidable with respect to the support plate.

4. The vehicle seat of claim 1 wherein the seatback frame includes first and second side portions, and a cross member extending between the side portions, and fixed to the cross member for supporting the first locking element.

5. The vehicle seat of claim 1 wherein the head restraint arrangement includes a second spring engaged with the second locking element for urging the second locking element into engagement with the first locking element of the seatback frame.

6. The vehicle seat of claim 1 further comprising a release device associated with one of the locking elements for disengaging the one locking element from the other locking element to allow the head restraint arrangement to move toward the initial position.

7. The vehicle seat of claim 1 wherein the first locking element comprises a first portion of a ratchet mechanism, and the second locking element comprises a second portion of the ratchet mechanism.

8. The vehicle seat of claim 1 wherein the head restraint arrangement is configured to move as a result of inertia of the head restraint.

9. The vehicle seat of claim 1 wherein the impact target is configured to receive the rearward force from the seat occupant.

10. A vehicle seat for use with a vehicle, the vehicle seat comprising:
    a seatback frame including first and second side portions, a cross member extending between the side portions, a support plate attached to the cross member, and a first locking element supported by the support plate, the first locking element being laterally slidable with respect to the support plate; and
    a head restraint arrangement movably associated with the seatback frame and including a second locking element that is engageable with the first locking element, wherein upon a sufficient impact to the vehicle, the head restraint arrangement is configured to move with respect to the seatback frame from an initial position toward a support position, and wherein the locking elements are configured to allow movement of the head restraint arrangement toward the support position, while inhibiting movement toward the initial position;
    wherein the seatback frame further includes a spring engaged with the first locking element for urging the first locking element into engagement with the second locking element of the head restraint arrangement, and a guide that slidingly receives the first locking element for guiding movement of the first locking element toward the second locking element.

* * * * *

UNITED STATES PATENT AND TRADEMARK OFFICE
CERTIFICATE OF CORRECTION

| | | |
|---|---|---|
| PATENT NO. | : 7,097,242 B2 | Page 1 of 1 |
| APPLICATION NO. | : 10/360391 | |
| DATED | : August 29, 2006 | |
| INVENTOR(S) | : Mark A. Farquhar et al. | |

It is certified that error appears in the above-identified patent and that said Letters Patent is hereby corrected as shown below:

Column 9, Line 59, Claim 1:

After "element" insert -- , a spring, and a guide --.

Column 9, Line 65, Claim 1:

After "element" insert -- wherein the spring engages the first locking element to urge the first locking element into engagement with the second locking element, and the guide slidingly receives the first locking element for guiding movement of the first locking element toward the second locking element --

Column 10, Line 12, Claim 3:

Delete "4" and insert --1--

Column 10 Line 19, Claim 4:

After "and" insert -- a support plate --.

Signed and Sealed this

Twenty-third Day of January, 2007

JON W. DUDAS
*Director of the United States Patent and Trademark Office*